W. WESTWATER.
RELIEF VALVE FOR CYLINDERS.

No. 170,974. Patented Dec. 14, 1875.

Witnesses.
James J. Johnston
J. G. Thompson

Inventor.
William Westwater
By A C Johnston
His Attorney.

UNITED STATES PATENT OFFICE.

WILLIAM WESTWATER, OF PITTSBURG, PENNSYLVANIA.

IMPROVEMENT IN RELIEF-VALVES FOR CYLINDERS.

Specification forming part of Letters Patent No. 170,974, dated December 14, 1875; application filed October 13, 1875.

*To all whom it may concern:*

Be it known that I, WILLIAM WESTWATER, of Pittsburg, in the county of Allegheny and State of Pennsylvania, have invented a new and useful Improvement in Relief-Valve for Steam-Cylinders; and I do hereby declare that the following is a full and exact description thereof, reference being had to the accompanying drawings and to the letters of reference marked thereon.

My invention relates to an improvement in relief-valve for cylinders of steam-engines, and is particularly applicable to cylinders of locomotives, and that class of steam-engines requiring to be reversed in the travel of their piston; and consists in the combination of the parts hereinafter described.

To enable others skilled in the art to make and use my invention, I will proceed to describe its construction and operation.

Figure 1:
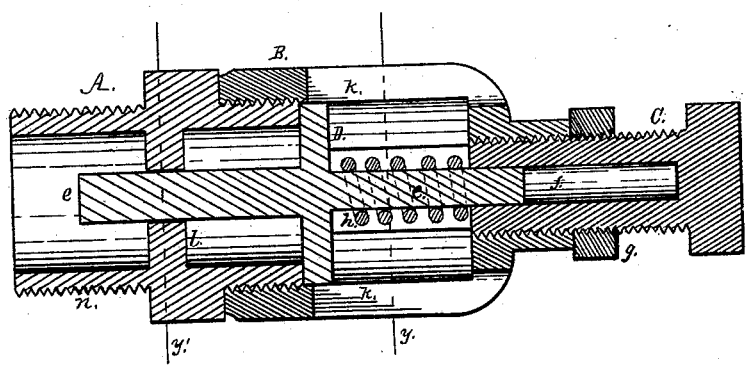
Figure 2:
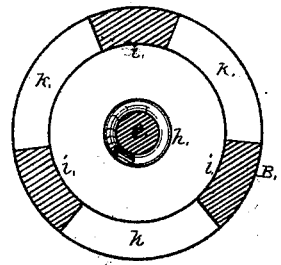
Figure 3:
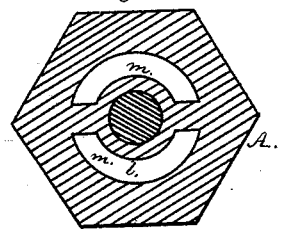

In the accompanying drawings, Figure 1 is a longitudinal section of my improvement in relief-valves. Fig. 2 is a transverse section of the same, at the line $y$ of Fig. 1. Fig. 3 is a transverse section of the same, at line $y'$ of Fig. 1.

A represents the valve-seat and guide for the inner end of the valve-stem, and is furnished with screw-threads at $n$. B represents a cap screwed upon the part A, and is furnished with a series of openings between the parts marked $i$, in the outer end of which cap is a hollow screw, C. D represents the valve; $e$, the stem of the valve; $f$, the bore of the hollow screw C. The screw C is furnished with a jam-nut, $g$, for holding it in a fixed position. Around the outer part of the stem $e$ of the valve D is placed a spiral spring, $h$. On each side of the guide $l$, for the inner end of the valve-stem $e$, are openings $m$.

As the construction of the valve and its parts will be readily understood from the foregoing description, and by reference to the accompanying drawings, I will proceed to describe its object and operation.

In reversing steam-engines it is very common to throw upon one end of the cylinder such force and strain as to blow off the head. To obviate this danger is the object of the hereinbefore-described valve. The part A is screwed into the head of the cylinder of the engine, and the screw C adjusted so as to cause the spiral spring to press upon the valve D to that degree which will prevent the leakage of steam, unless greater pressure in the cylinder occurs than is required for the labor demanded of the engine, in which event the undue pressure acting on the valve D will open it, and the surplus steam allowed to escape out through openings $m$ and $k$, which are sufficiently large to allow for a free egress. By the use of the jam-nut $g$ on the hollow adjusting-screw C, it will be held in a fixed position, so that the tension of the spring $h$ upon the valve D can be adjusted without liability of change. The enlarged openings $m$ and $k$ are of the utmost importance in this class of valves, for the sudden reversing of the piston of the engine requires a free vent for the escape of the surplus pressure brought on the cylinder by the reversing of the piston.

I am aware that safety-valves for steam-cylinders have been made similar in many respects to the one hereinbefore described, and, therefore, I do not claim such valve, broadly; but What I do claim as of my invention is—

In a safety-valve for steam-cylinders, the combination, with the spring-pressed valve D, having stems $e$ $e$, of the valve-seat provided with guides, the longitudinally-slotted cap B, hollow screw C, and jam-nut $g$, all arranged to operate substantially as set forth.

In testimony whereof I hereunto set my hand this 10th day of September, 1875.

WILLIAM WESTWATER.

Witnesses:
 A. C. JOHNSTON,
 D. I. K. RINO.